Dec. 1, 1953  G. L. BRIGGS  2,661,269
DEVICE FOR ENHANCING THE VAPORIZATION OF A FUEL
COMPONENT OF A FLOWING FUEL-AIR MIXTURE
Filed Nov. 15, 1948  4 Sheets-Sheet 3
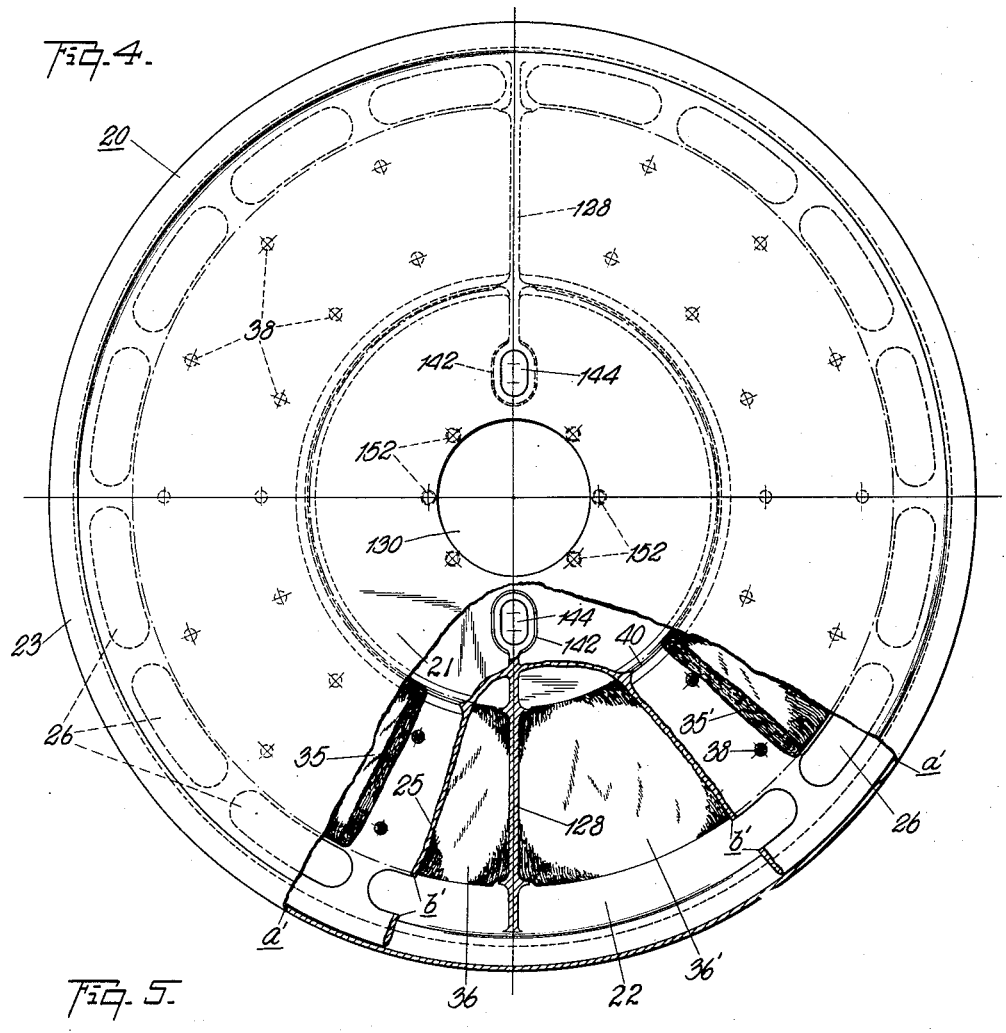
Fig. 4.
Fig. 5.
Fig. 6.
INVENTOR.
George L. Briggs
BY D. MacKenzie
AGENT

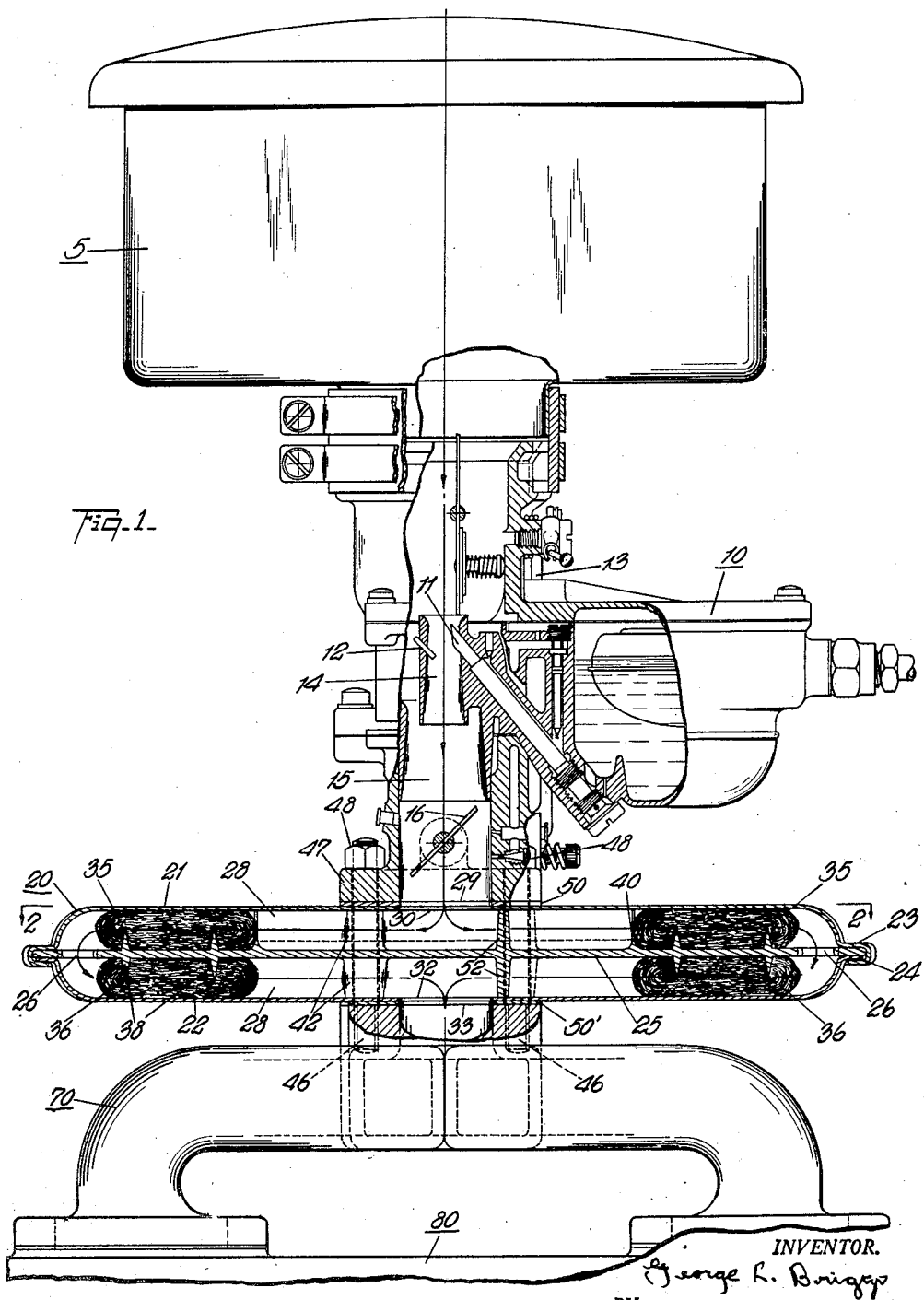

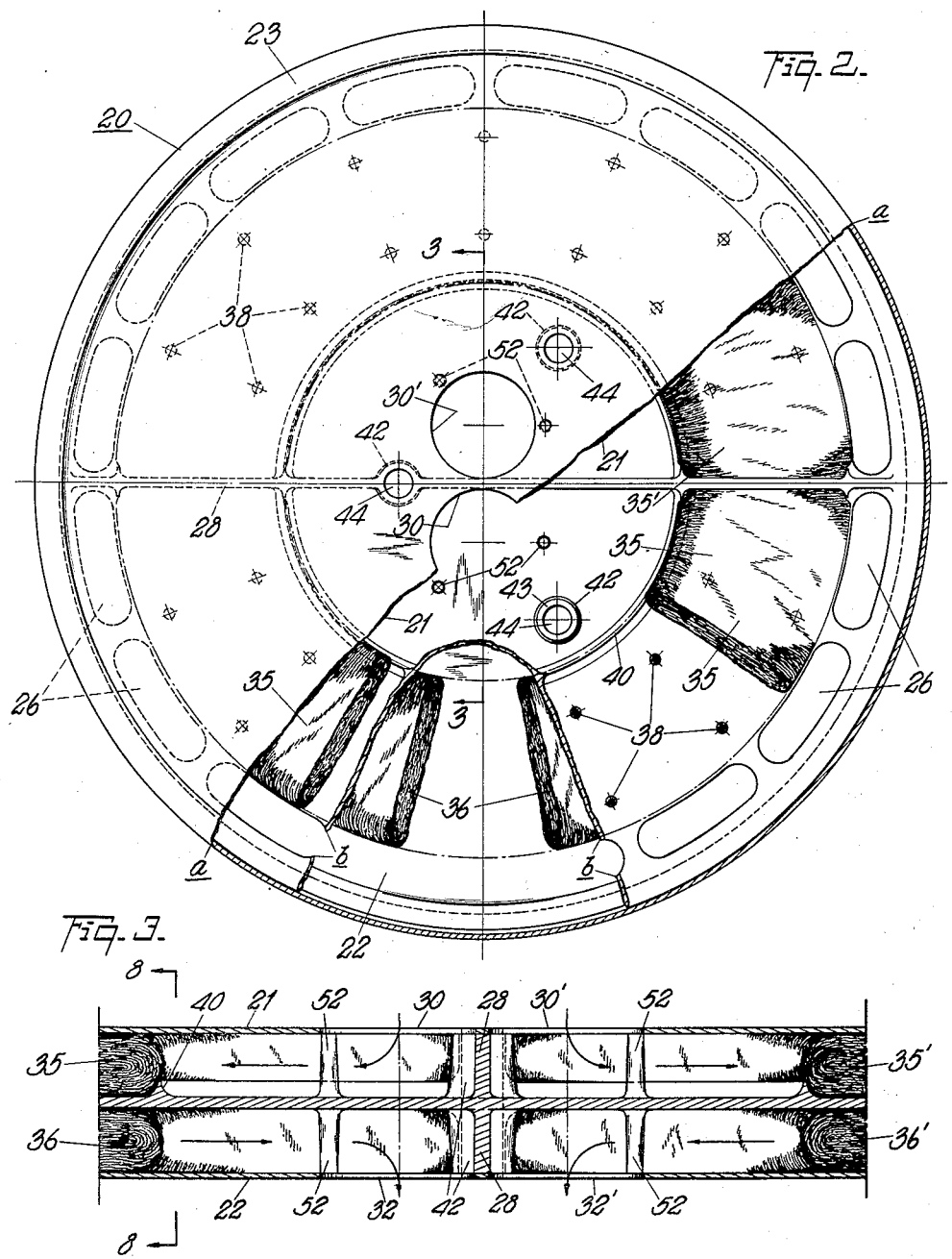

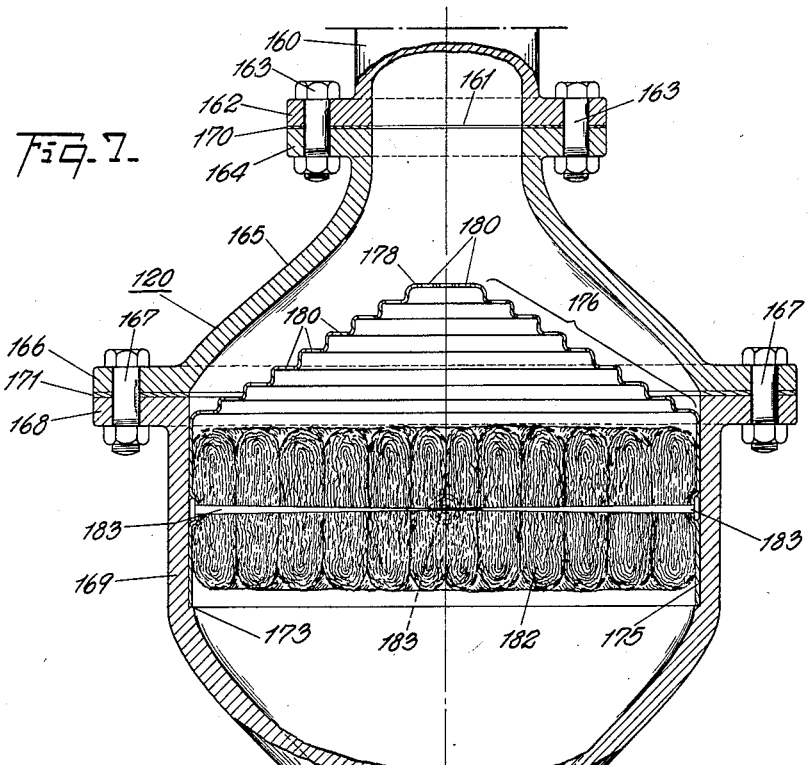
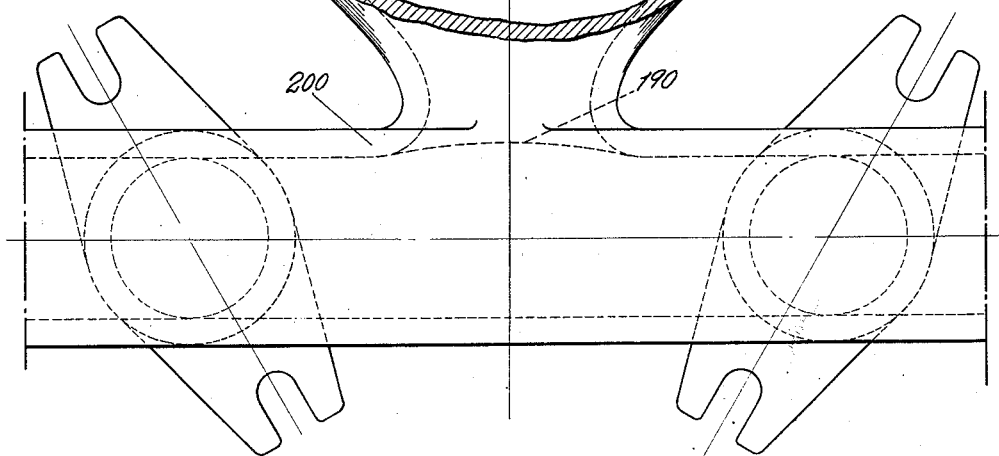
Fig. 7.
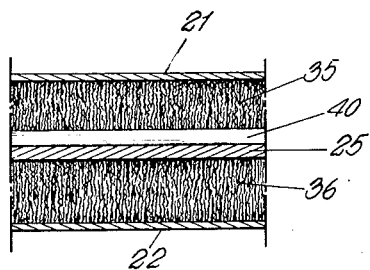
Fig. 8.
INVENTOR.
George L. Briggs
BY
D. MacKenzie
AGENT Patented Dec. 1, 1953

2,661,269

UNITED STATES PATENT OFFICE 2,661,269

DEVICE FOR ENHANCING THE VAPORIZATION OF A FUEL COMPONENT OF A FLOWING FUEL-AIR MIXTURE

George L. Briggs, Oneida, N. Y., assignor to Briggs Research & Development, Inc., White Plains, N. Y., a corporation of New York Application November 15, 1948, Serial No. 60,001

18 Claims. (Cl. 48—180)

This invention relates to an improvement in fuel vaporizers particularly useful in the operation of internal combustion engines such as those of automobiles.

The general object of the invention is to provide a method and means for effecting substantially complete vaporization of a liquid fuel in a fuel-air mixture.

I am aware that in the past thirty years numerous devices have been proposed with the same object, but the vaporizers of the prior art have relied upon boiling the droplets of fuel by causing them to impinge on "hot spots" or by passing the mixture through an enclosure the walls of which are heated from a surrounding jacket through which flows a part of the exhaust gases of the engine. These devices have the disadvantage of reducing to a greater or less extent the volumetric efficiency of the engine because of the higher temperature of the charge admitted to the cylinders.

In the present invention this disadvantage is avoided altogether. The fuel droplets are spontaneously evaporated from the thin films into which they spread in passing over and wetting ribbon-like metal filaments, loosely formed into a packet or the equivalent, interposed in the path of the mixture between the carburetor and the cylinders of the engine. No auxiliary heat is supplied or needed; the evaporation of the fuel from the wetted filaments cools the chamber in which the interposed packet is held, and with that cools also the fuel mixture, so that the volumetric efficiency is increased over that of the same engine without the invention. The heat of vaporization is derived from the thermal energy of the mixture supplied from the carburetor.

An object of the invention is therefore to provide a fuel vaporizer which requires no addition of heat to bring about substantially complete evaporation of the fuel in its mixture with air.

By attaining the above-stated objects, the invention provides numerous advantages, among which may be mentioned the following:

Since the charge entering the cylinder on the suction stroke of the piston is a homogeneous mixture of fuel vapor and air, the risk of crankcase oil dilution by liquid fuel passing the piston rings during the compression stroke is abolished whereby the piston rings and piston and cylinder walls are not scavenged of their protective film of oil and there is no danger of deposits on piston or cylinder heads due to incompletely burned fuel droplets;

Cold weather starting of the engine is facilitated, inasmuch as the charge is made an intimate mixture of fuel vapor with air and choking of the carbureter is unnecessary.

At the same time that volumetric efficiency is increased, fuel consumption is reduced for the same engine power, because all the fuel drawn in on the suction stroke is consumed, thus the thermal efficiency of the engine is increased;

As a direct consequence of the last mentioned advantage, carbon monoxide in the exhaust gases is enormously reduced in percentage of total exhaust;

The interposed packet is an acoustic filter which efficiently damps out the fluctuations of negative pressure in the intake manifold, thereby enabling the flow of air and fuel through the carbureter to be continuous and smooth, whatever the number of cylinders it must supply;

The last named advantage carries with it the avoidance of fluctuations in the mixture ratio supplied by the carbureter and facilitates supplying all the cylinders with fuel charges of the same composition.

The provision of the above advantages together with others which will be apparent from the ensuing description, is an object of the invention.

Inasmuch as downdraft carbureters are wellnigh universal, the invention will be described and illustrated with reference to such. Those skilled in the art will readily make the changes called for if other than downdraft carbureters are concerned.

Briefly, the vaporizer of the present invention comprises a chamber interposed between the efflux orifice of the carbureter and the influx orifice of the intake manifold, the axes of these orifices being vertically aligned as usual. In one construction, the chamber takes the form of a shallow cylinder the median plane of which is at right angles to the axes above mentioned. The cylinder is formed of a pair of opposing circular metal plates, suitably spaced apart vertically, and reciprocally dished near their perimeters to be joined together, inclosing between them a baffle provided with circumferential ports near the junction of the plates. An orifice is provided in the upper plate, continuous with the efflux orifice of the carbureter, and a like orifice in the lower plate is continuous with the influx orifice of the intake manifold.

Both above and below the baffle is a toroid of filaments of metallic ribbon formed in such a manner as to provide a pervious packet, the filaments, where flow in these regions is to be radial, advantageously extending radially between an inner radius greater than that of the efflux orifice or the influx orifice and an outer radius less than the inner radius of the ports above mentioned. From the carbureter, the incoming fuel-air mixture enters the vaporizer chamber, spreads radially outward through the upper pervious packet, passes through the ports to spread radially inward through the lower pervious packet and finally enters the intake manifold. Fuel droplets present in the mixture fed by the carbureter wet the filaments, and by structural relationships and coactions later illustratively described, these fuel droplets are made to spread out lengthwise on the filament surfaces in a plurality of thin films from which, by the air-flow control action of the filaments, they are easily evaporated in the accompanying air stream, which is highly turbulent within the packets only; it is this feature, illustratively described in greater detail hereinafter, which enables the vaporizer to dispense with heat supplied to boil the fuel, from the exhaust or elsewhere. As the engine warms up, some heat is by conduction supplied to the plates of the chamber and so to the packets, but this heat supply is incidental. In an actual installation of the vaporizer, the same was found cold to the touch after carbureter and intake manifold were uncomfortably hot.

Both the baffle and the pervious packets should be non-flammable and also inert to the various components of the fuel, such as heptane. With these limitations, the filaments of the pervious packets may be of any material impervious to and wettable by the fuel, preferably a material of low specific heat. Copper ribbon, for example, has been found suitable.

The invention will be fully understood from the following detailed description of a preferred embodiment thereof, read with reference to the accompanying drawings, in which Fig. 1 is a side elevation, partly in section and partly broken away with some of the parts omitted, taken in a plane at right angles to the vertical plane including the throat axes of a double-throat carbureter, of an assembly showing the vaporizer of the invention installed between the carbureter and the intake manifold of an internal combustion engine;

Fig. 2 is a plan view, partly in section and partly broken away, of the vaporizer taken in the direction of the arrows 2—2 of Fig. 1;

Fig. 3 is an enlarged sectional view, broken away, taken on the line 3—3 of Fig. 2 and looking in the direction of the arrows;

Fig. 4 is a plan view, partly in section and partly broken away, of a modification of the vaporizer suitable for a single-throat carbureter;

Fig. 5 is a plan view, greatly enlarged, of a portion of a filament;

Fig. 6 is a side elevation of the filament portion shown in Fig. 5;

Fig. 7 is a vertical section of the simplest form of vaporizer according to the invention, adapted to a single-throat carbureter; and Fig. 8 is a tangential view at right angles to the plane of Fig. 3 and taken on the line 8—8 thereof in the direction of the arrows.

In all figures, like elements are identified by like numerals.

Referring now to Fig. 1, air drawn through air cleaner 5 passes through carbureter 10 entraining fuel from either atomizing jet 11 or injector 12 actuated by pump 13. The fuel-air mixture passing primary and secondary venturis 14 and 15, respectively, and throttle 16, enters vaporizer 20. In the figure the plane of the view is chosen to include the axis of one of the carbureter throats; it will be understood that the vaporizer is concentric with the vertical line midway of the throat axes.

Vaporizer 20, through which the fuel-air mixture passes from carbureter 10 to intake manifold 70, thence to engine 80, includes a chamber formed within the shells 21 and 22. These shells are metal plates, suitably of aluminum, formed as shown in Fig. 1 and extended at their peripheries into flanges 23 on shell 21, 24 on shell 22. In the median plane of the body formed by bringing together shells 21 and 22 is a baffle 25, impervious to the fuel and adapted to be caried between flanges 23 and 24. After the assembly presently to be described, flange 23, which is radially more extended than flange 24, is formed first downwardly and thence inwardly to encompass flange 24 and baffle 25 in a gas-tight seizure. Baffle 25 is provided with ports 26, shown in Figs. 1 and 2.

In Fig. 2, shell 21 is partly broken away to show beneath it baffle 25, which in turn is broken away to show beneath it shell 22.

Inasmuch as a double-throat carbureter is to be used, the chamber formed between shells 21 and 22 is diametrally divided by a vertical baffle 28, installed in a plane at right angles to the line of centers of the carbureter throat orifices 29 and 29', of which orifice 29 is shown in Fig. 1. Orifice 29' is understood to be below the plane of Fig. 1 as drawn. Likewise, baffle 28 is below the plane of Fig. 1, being in the vertical plane midway of the carbureter throats, but for convenience is shown in the figure, extending above and below baffle 25.

Shell 21 is provided with a pair of apertures 30 and 30', each of the same diameter as and concentric with the coresponding carbureter orifices 29 and 29'. Similar apertures 32 and 32' are provided in shell 22, coacting respectively with the orifices of the intake manifold aligned with the respective carbureter orifices. Of the intake orifices only one, 33, is shown in Fig. 1. Shells 21 and 22; baffle 25 and baffle 28; apertures 30, 30' in shell 21, 32, 32' in shell 22; and the inner portions of packets 35, 36, 35' and 36', are shown in Fig. 3.

The fuel-air mixture drawn from carbureter 10 passes from the individual throats thereof into the separate chambers formed within shells 21 and 22 by baffle 28, passes radially outward in these chambers to pass through ports 26 in baffle 25, and eventually enters the intake manifold through orifices 32 aligned with 33 for one throat, 32' aligned with 33' for the other throat. The just described path or paths of flow are indicated by the full-line arrows shown in Fig. 1, and it will be seen that the flow in the chamber above the baffle 25 is radially outward and in the chamber below the baffle 25 the flow is radially inward.

From orifice 29 through aperture 30 on one side of vertical baffle 28, the mixture to reach ports 26 must pass through a semi-toroidal packet 35 of filamentous material, such as copper or aluminum ribbon. Packet 35 is semi-toroidal so that its ends will terminate against the baffle 28 which, as above described, falls on a diameter; that is, the chamber in which the semi-toroidal packet 35 rests, happens to be semi-circular. The filaments of this semi-toroidal packet, later described in greater detail, extend generally radially and hence in the direction of flow through that particular chamber, and in Figs. 1 and 2 the radial lay of the filaments is indicated, particularly in relation to the full-line arrow of flow shown in Fig. 1. Fuel droplets carried by the stream from carbureter 10 wet the individual filaments of packet 35, spreading out thereon into thin films from which they are readily evaporated by the turbulent air stream within the packet. Passing thence through ports 26, the mixture traverses like filaments of packet 36. In Fig. 1, packet 35 is in the upper part of the chamber between shells 21 and 22, above baffle 25; packet 36 is below baffle 25 and is also semi-toroidal, with the filaments thereof extending generally radially. Emerging from packet 36 radially toward aperture 32 alligned with intake manifold orifice 33, the mixture enters manifold 70 as a homogeneous mixture of air and fuel vapor ready to be supplied to the various cylinders of engine 80 in uniform composition with no danger of adherence of liquid fuel to bends in the intake manifold.

Packets 35 and 36, duplicated as packets 35' and 36' on the other side of baffle 28, are anchored to baffle 25 by conoidal lugs 38 formed on baffle 25 and extending upward and downward therefrom. The semitoroidal packets are thus fixed in position relative to apertures 30 and 32 on one side of baffle 28, and to apertures 30' and 32' on the other side of that baffle. To provide for the evaporation of liquid fuel as from injector 12, Fig. 1, a sling ring 40 concentric with the axis of vaporizer 20, interrupted by but joining on each side baffle 28 and abutting packet 35 at its inner radius, is formed to extend upward from baffle 25 about one-fourth of the depth of the upper chamber of the vaporizer. This insures that a pool of liquid fuel, which may form inside ring 40 due to any of several causes, on the upper surface of baffle 25, shall not enter manifold 70 without being evaporated in passing through the packets.

The provision of sling ring 40 altogether prevents flooding of the cylinders and wholly overcomes excessive choking. No fuel passing the carbureter jets or the injector can reach the cylinders in liquid form; it is caused by the air stream to rise above ring 40 and enter packets 35, 35' to be vaporized in passing therethrough and through packets 36, 36'.

In the heretofore usual carburetion systems, it is common experience that engine cylinders are flooded at sudden stops when the inertia of the fuel in the float chamber drives it through the carbureter jets; when due to poor engine cooling or high summer temperatures the fuel percolates through the jets; when the throttle is suddenly opened at stalling speeds; or when the throttle and the injection pump are excessively actuated in starting. This flooding, common in the conventional carburetion system, is overcome by the invention, thereby attaining another object thereof.

The features just described, and others later to be mentioned, are best seen in Fig. 2, where shell 21 is broken away at the line a—a to show beneath it portions of packets 35 and 35' and baffle 25, and baffle 25 is itself broken away at the line b—b to reveal packet 36 as well as a part of shell 22.

To install vaporizer 20 between carbureter 10 and intake manifold 70, baffle 25 is provided with a plurality of cored bosses 42 extending vertically above and below baffle 25. Bosses 42 have outer surfaces 43, Fig. 2, at their upper and lower ends which take bearing on the respective inner surfaces of shells 21 and 22 in each of which is formed an aperture 44 in alignment with the core of each boss 42. Through bosses 42 and apertures 44 aligned therewith pass studs 46 carried by intake manifold 70 and ending in threaded portions after passing through the appropriate holes in carbureter flange 47, Fig. 1. Nuts 48, one of which is shown in Fig. 1, secure carbureter 10, vaporizer 20 and intake manifold 70 in detachable relation. Gas tightness at the meeting planes of carbureter 10 and vaporizer 20 and of vaporizer and intake manifold is afforded by gaskets 50, 50', Fig. 1, which gaskets may be of any desired thickness.

It will be understood that the boss 42 indicated in Fig. 1 is below the plane of that view, being in a particular installation centered on the midline of vertical baffle 28; in this installation, the carbureter and the intake manifold were connected by three studs 46, as shown in Fig. 2, passing through the three apertures 44 in shell 21 and similarly through shell 22.

In addition to gaskets 50 and 50', it has been found useful to provide a plurality of bearing columns 52, Figs. 1, 2 and 3. Columns 52 are conveniently arranged adjacent apertures 30, 30'; they are formed integrally with baffle 25 and extend upwardly and downwardly therefrom to bear at their extremities on the inner surfaces of shells 21 and 22, intermediate bosses 42, and prevent inward deflection of those shells.

In Fig. 3 are shown, on an enlarged scale compared with Figs. 1 and 2, the bosses 42 and columns 52, as well as sling ring 40 and the inner portions of packets 35, 35', 36 and 36'. In Figs. 1 and 3, the direction of flow of the fuel-air mixture is indicated by the arrows downward and radially outward below shell 21, radially inward and downward above shell 22, as the mixture passes from carbureter 10 to intake manifold 70.

The filaments indicated in Figs. 1, 2 and 3 are, suitably about 3 mils thick and 15–25 mils wide. They are preferably formed with undulations both transversely and longitudinally, as shown in Figs. 5 and 6, respectively. As before stated, the filaments advantageously are arranged to extend radially, this being the general direction of flow of the mixture in the particular embodiment being described; when so arranged, the filaments, intermingled lengthwise one with another in the packets, present to the mixture stream a multitude of substantially continuous, long and narrow surfaces along and on which fuel droplets can be spread out in thin films extending in the direction of flow, and between these filaments there is formed a multitude of generally lengthwise extending non-continuous interconnected passages that join the regions where take place entrance and exit of the mixture into and out of the packets 35 and 35' above, packets 36 and 36' below, respectively, baffle 25.

Fig. 8 is a fragmentary sectional view as seen along the line 8—8 of Fig. 3, showing in fragmentary elevation the entry end of packet 35 and the exit end of packet 36 (see arrows in Fig. 3); in this end elevation of the packets, the ribbon-like filaments appear vertically simply because, as better appears in Fig. 1 and also in Fig. 3, the individual packet may be built up by laying the ribbon-like filament of Figs. 5 and 6, starting at the mid-plane of a packet as seen in Fig. 1, back and forth along a radius and between the limits of the inner radius of the semi-toroidal shape and the outer radius thereof, the lay being substantially radial as Figs. 1 and 2 clearly indicate. While the filaments thus extend generally radially, the undulations in the ribbons, as indicated in Figs. 5 and 6, coact as spacing elements between adjacent or contiguous radial extents of the ribbon filaments and thus aid in maintaining good exposure of the surfaces of the filaments and in maintaining longitudinally and laterally interconnected, radially extending passages between and amongst the ribbon filaments, all for coaction with the fuel-air mixture that has to flow along the passages and thus sweep lengthwise of the exposed filament surfaces. Fuel globules or droplets of the entering mixture can hardly escape being swept or skidded onto the generally radially extending narrow surface strips onto and lengthwise of which they are filmed out by the action of the flow that takes place in generally the same radial direction. With such substantially progressive thinning out of the film or films, in the direction of flow of the mixture, evaporation is greatly enhanced and facilitated. The undulations shown in Figs. 5 and 6 bring about the interconnection, at numerous points radially of the packet, of each passage with its neighboring passages; by reason of these interconnections as well as by the deflecting action of the undulations a high degree of local turbulence while maintaining radial flow within the packet is produced in the stream of fuel and air and such action conduces to the rapid evaporation of the films of fuel formed along the filaments as the fuel wets them. In a practical case illustrative of the use of the invention, the subdivision by the filaments presented some five hundred passages per square inch in the section of the packet as represented in Fig. 8.

In the illustrative practical case above alluded to, in which the filaments composing the packets were of copper, each semi-toroidal packet weighed 2.5 ounces. The outlet orifices of the carbureter and the intake manifold's input orifices had each the diameter 1.437 inch; above and below baffle 25, each chamber of vaporizer 20 was 0.5 inch in depth; the sling ring was 5.0 inches in diameter and 0.125 inch high; the radial width of the packets was 2.0 inches; and the radial width of the sixteen ports 26 was 0.562 inch. Like dimensions are recommended for single-throat carbureters of which the orifices are of area equal to the total area of the two orifices of the carbureter indicated in Figs. 1 and 2, and similar proportions are suitable for carbureters of other orifice diameters than those above stated by way of illustration.

Fig. 4 illustrates the application of the invention to an engine supplied by a single-throat carbureter, the efflux orifice is aligned with orifice 130 in shell 21. In the figure, shell 21 is broken away on the line $a'—a'$ to reveal packets 35 and 35' and baffle 25, as in Fig. 2, baffle 25 being broken away on the line $b'—b'$ to show packets 36, 36', the division above and below baffle 25 being as before in Fig. 2 by a vertical baffle 128 extending upwardly and downwardly from baffle 25. Here baffle 128 is provided for stiffening the structure and extends inwardly from the outer radius of ports 26, on each side of center, only as far as cored bosses 142; these bosses and the apertures 144 therein are diametrically opposed and extend above and below baffle 25, as in Figs. 1 and 2. They are radially elongated to accommodate intake manifold studs of various spacings, and serve to secure the vaporizer between the carbureter flange and the intake manifold as do the bosses 42 of Fig. 1. A plurality of bearing columns 152 is provided, integral with baffle 25 and extending above and below that baffle, serving to prevent inward deflection of shells 21 and 22 in the same manner as columns 52 of Figs. 2 and 3. Concentric with vaporizer 20 and interrupted on a diameter thereof by baffle 128, as in Fig. 2, is sling ring 40, integrally formed with baffle 25 and extending upwardly therefrom one-fourth the depth of the upper chamber of vaporizer 20. As in Fig. 2, anchoring lugs 38 serve to confine in proper position packets 35, 35', 36 and 36'.

Figs. 1, 2 and 4 are drawn to the same scale; it will be noticed that the area of orifice 130 in Fig. 4 is equal to the combined areas of orifices 30 and 30' of Fig. 2, and that the dimensions of the packets and of outer flange 23 are likewise the same as in Fig. 2. In other words, the vaporizer of Fig. 4 is the same as that of Figs. 1 and 2, adapted to an engine of the same displacement but supplied with a fuel-air mixture from a single-throat carbureter.

In Fig. 7 is shown a vertical section including the axis of a single-throat downdraft carbureter, where a vaporizer 120 of the simplest form according to the invention is interposed between efflux orifice 161 of the carbureter and branch orifice 190 of the intake manifold 200 of an internal combustion engine, neither carbureter nor engine being shown, except that carbureter 160 is shown partly in perspective and broken away just above its termination in orifice 161 and flange 162. By bolts 163 there is suitably secured to flange 162 the flange 164, the upper termination of a cup-shaped adapter 165 of which flange 166 is the lower termination. By a plurality of bolts 167, of which two are shown, adapter 165 is secured to portion 169 formed integrally with manifold 200 and having a bowl shape near the manifold, then rising cylindrically to be radially extended in flange 168, suitably provided with apertures to receive bolts 167. It will be understood that the structure described is, above branch orifice 190, symmetrical about the vertical axis common to orifices 161 and 190. Gastight seals are provided by gaskets 170 and 171 between flanges 162 and 164 and between flanges 166 and 168, respectively. Bowl-shaped portion 169 is shown partly in perspective and broken away near its junction with manifold 200.

A shoulder 173 is formed interiorly of portion 169 at the upper level of the bowl-shaped part thereof, and above this shoulder the inner cylindrical surface of portion 169 rises to be aligned with the like surface of adapter 165. Seated on shoulder 173 and snugly fitting inside portion 169 is cylindrical cage 175, which extends upward from near the level of flange 168 in a series of annular terraces 176, of decreasing radius and ending in a flat portion 178. Symmetrically about the vertical axis, terraces 176 and central flat portion 178 are each pierced by a plurality of apertures 180 through which the fuel-air mixture passing downward from orifice 161 is divided into a like plurality of streams.

Within cage 175 is supported a pervious packet 182, similar in filamentous structure to the packets described earlier herein. Packet 182 extends vertically through substantially the entire height of the cylindrical portion of cage 175; it occupies the entire section of portion 169 at right angles to the plane of the figure and to fill that transverse extent or region, it conveniently comprises, as indicated in Fig. 7, a suitable number of laterally engaging sections, each of which is of a cross-section like the cross-section of packet 35 or 36 of Fig. 1, with the sections disposed so that the filaments thereof are vertical, in the embodiment shown in Fig. 7. Again advantageously, the ribbon-like filaments constituting packet 182 extend generally parallel to the vertical axis and so to the general direction of mixture flow. To support packet 182 within cage 175, a plurality of pins 183 project radially inward from the outer wall of the cage; two such pins are shown in the figure, on a diameter through packet 182 and its connecting sections in the median horizontal plane thereof, and one other pin at right angles to those shown is indicated.

As in the constructions shown in Figs. 1 to 4, inclusive, the fuel-air mixture drawn through orifice 161 divides into a plurality of streams, in this case through apertures 180. These apertures and the terraced construction of the upper part of cage 175 perform the offices of baffle 25, of ports 26 and of sling ring 40 of Fig. 1. The fuel droplets in the mixture descend in a dispersed rain on the upper level of packet 182 which they enter to wet, and spread out in thin films on, the component filaments of the packet. The fuel films so formed are evaporated in the turbulent air stream, made so by the interlacing undulations of the filaments, and the issuing mass of fuel vapor and air enters manifold 200 as a homogeneous charge.

It has already been pointed out that the pervious packets constitute an acoustic filter which refuses transmission of pulsations of negative pressure from the intake manifold to the carbureter throat, whereby the atomizing action of the venturis is protected from disturbance, and uniformity of mixture flow is assured. In addition, the pressure wave, akin to water hammer in a pipe, which in the hitherto known carburetion systems is produced by the sudden closing of the intake valve, is strongly suppressed by the packet with the effect of greatly minimizing the possibility of stratification of the mixture. This effect promotes the furnishing of charges of uniform weight, as well as of uniform composition, to the individual cylinders of the engine. Inasmuch as the mixture thereto furnished consists of air and fuel vapor, excluding substantially all fuel in liquid form, the mixture is enabled to travel through the branches of the intake manifold without regard to bends or obstructions therein; the mixture flow is similar to that of gas in a pipe, where bends or discontinuities of the inside surface are harmless.

Increased fuel economy is an obvious result of the use of the invention, as has been shown by actual road trial; another result is the substantially complete elimination of carbon monoxide and of free hydrocarbons from the exhaust. These advantages result from the substantially complete combustion of all the fuel supplied by the carbureter. Since the supplying of external heat to boil the fuel droplets is avoided, the volumetric efficiency of a given engine is increased, the entering mixture being at a lower temperature. The provision of a homogeneous mixture free from stratification and "water hammer" reduces the engine's tendency to knock and thus permits a higher compression ratio with a given fuel or the use of a wider cut fuel with a given compression ratio. The rate at which the fuel mixture passes from carbureter throat to intake manifold is lessened; this together with the vastly increased evaporating surface presented by the packet filaments insures the volatilization of the fuel droplets and in addition enables the engine to accelerate with much greater smoothness and no less rapidity than can an engine unprovided with the vaporizer of the present invention.

Obviously the usefulness of the invention is not limited to the particular application above described in detail, but extends to the case of any stream of gas transporting a liquid component in atomized form where it is desired to vaporize the liquid droplets in the stream.

I claim:

1. For an internal combustion engine provided with an intake manifold and a carbureter having an efflux orifice through which a fuel-air mixture is supplied to the influx orifice of the manifold, a fuel vaporizer adapted to be interposed between said orifices comprising a first and a second concave shell coaxially joined together in a plane at their perimeters to form an enclosure, a disc-like baffle dividing the enclosure into an upper and a lower chamber whereby said baffle forms the bottom wall for the upper chamber and a portion of one of said shells forms the bottom wall for the lower chamber, a plurality of ports in the baffle permitting intercommunication between the chambers, an orifice in the first shell aligned with the efflux orifice, an orifice in the second shell aligned with the influx orifice, a filamentous vaporizing packet arranged in at least one of the chambers so that the length of the filaments thereof is substantially parallel to radial flow between the orifice of the chamber and said baffle ports, said packet having a substantially oblong cross-section generally parallel to said filaments and terminating in inner and outer substantially circular ends of different radii and arranged with respect to the chamber orifice and said baffle ports, said filaments being in closely associated arrangement and having flow passages therebetween for movement of fuel-air mixture between said chamber orifice and said baffle ports, and a baffle arranged substantially coaxially with one of said circular ends of the packet and extending upwardly from the bottom wall of the chamber containing the packet for compelling the mixture to enter the packet at a level above the said bottom wall.

2. For an internal combustion engine provided with an intake manifold and a carbureter having an efflux orifix through which a fuel-air mixture is supplied to the influx orifice of the manifold, a fuel vaporizer adapted to be interposed between said orifices comprising a first and a second concave shell joined together in a plane at their perimeters to form an enclosure, a baffle dividing the enclosure into a first and a second chamber, a plurality of ports in the baffle permitting intercommunication between the chambers, an orifice in the first shell aligned with the efflux orifice, an orifice in the second shell aligned with the influx orifice, and a vaporizing packet in at least one of the chambers interposed between the baffle ports and the orifice in the corresponding shell, said packet being formed of a plurality of adjoining undulating smooth ribbon filaments forming a multitude of interconnected air spaces, the filaments being themselves impervious to but wettable by the fuel in the mixture and extending lengthwise generally in the direction of flow of the mixture.

3. A fuel vaporizer for an internal combustion engine having an intake manifold supplied with a fuel-air mixture from a downdraft carbureter, comprising a pair of oppositely concave shells joined at their perimeters to form an enclosure, a baffle dividing the enclosure into a first and a second chamber, a plurality of ports in the baffle perimetrically arranged therein near the line of junction of the shells, an orifice in the first chamber communicating with the carbureter, an orifice in the second chamber communicating with the intake manifold, and pervious means in each chamber and interposed in the path of flow between the orifice therein and the ports in the baffle for enhancing vaporization of liquid components of the fuel-air mixture, said means comprising a vaporizing packet having a plurality of elongated small-cross-sectioned wettable elements arranged so that the length of said small-cross-sectioned elements is substantially parallel to radial flow between the chamber orifice and said baffle ports, said elements being in closely associated arrangement and having therebetween generally elongated communicating passages for movement of fuel-air mixture therealong between the chamber orifice and said baffle ports, there being one packet for each chamber, whereby said wettable elements present elongated surfaces that are substantially parallel to the flow of fuel-air mixture through the packet for receiving thereon fuel droplets which are filmed out along said surfaces of said elements by the lengthwise moving fuel-air mixture and the films thereon further attenuated and the liquid thereof vaporized by said continued movement.

4. A fuel vaporizer for an internal combustion engine having an intake manifold supplied with a fuel-air mixture from a downdraft carbureter, comprising a pair of oppositely concave shells joined at their perimeters to form an enclosure, a baffle dividing the enclosure into a first and a second chamber, a plurality of ports in the baffle perimetrically arranged therein near the line of junction of the shells, an orifice in the first chamber communicating with the carbureter, an orifice in the second chamber communicating with the intake manifold, and a vaporizing packet pervious to the mixture in each chamber interposed between the orifice therein and the ports in the baffle, each of said packets comprising a plurality of undulating smooth ribbon filaments intermingled with air passages and extending lengthwise generally in the direction of flow of the mixture in the corresponding chamber, the filaments being impervious to but wettable by the fuel in the mixture.

5. A fuel vaporizer for an internal combustion engine having an intake manifold supplied with a fuel-air mixture from a downdraft carbureter, comprising a pair of oppositely concave shells joined at their perimeters to form an enclosure, a baffle dividing the enclosure into a first and a second chamber, a plurality of ports in the baffle perimetrically arranged therein near the line of junction of the shells, an orifice in the first chamber communicating with the carbureter, an orifice in the second chamber communicating with the intake manifold, and a vaporizing packet pervious to the mixture in each chamber interposed between the orifice therein and the ports in the baffle, with a fuel barrier in the first chamber supported by the baffle and extending upwardly therefrom to compel the mixture to enter the packet in the first chamber at a level above the baffle, said barrier being intermediate the orifice and the packet in the first chamber.

6. In a system for delivering a fuel-air stream to the cylinders of an internal combustion engine from a carbureter which provides in response to the operation of the engine an air stream containing a liquid fuel component for flow to an intake manifold receiving the stream for distribution to the cylinders, an air-tight casing having means for connecting it between the carbureter and the intake manifold and providing intercommunication therebetween for flow from the carbureter to the intake manifold, said airtight casing having therein a vaporizing packet positioned wholly within the path of flow of said energy stream, said packet having a multiplicity of impervious wettable individually sinuous filaments generally oriented so that their effective longitudinal axes extend generally lengthwise of the direction of flow of said stream through said casing.

7. In a carbureting system supplying a fuel-air mixture from a carburetor to the intake manifold of an internal combustion engine a fuel vaporizer for connection between the carbureter and the manifold comprising an enclosure having entry connection for receiving the fuel-air mixture from the carbureter and an exit connection with said manifold, said enclosure providing a path of flow for guiding fuel-air mixture from said entry connection to said exit connection and having means in said path of flow for compelling liquid fuel components of the mixture to film out in progressively attenuated liquid films and to enhance vaporization thereof, said means having a plurality of impervious wettable elongated elements of relatively small cross-section arranged so that the length of said elements is substantially parallel to the flow of fuel-air mixture in said path, said elements being in closely associated arrangement and having lengthwise extending flow passages therebetween for passage of the fuel-air mixture therealong and along the narrow elongated surfaces of said elongated elements whereby fuel droplets deposited thereon are swept along said passages by the fuel-air mixture to be filmed out and progressively attenuated lengthwise thereon by the lengthwise sweeping fuel-air mixture and to supply the liquid films with heat of vaporization from the moving fuel-air mixture whereby the mixture delivered to the manifold is at a temperature lower than that of the mixture supplied to the enclosure from the carbureter.

8. A fuel vaporizer adapted to be interposed between the efflux orifice of a carbureter supplying a fuel-air mixture and the intake manifold of an engine, comprising a casing, intake and outlet orifices in the casing communicating respectively with the efflux orifice and the manifold, and pervious means in said casing and interposed in the path of flow between said intake orifice and said outlet orifice to pass said fuel-air mixture therethrough for enhancing vaporization of liquid components of the fuel-air mixture, said pervious means having a plurality of elongated small-cross-sectioned impervious wettable elements arranged so that the length of said elements is substantially parallel to the direction of flow of the mixture from said intake orifice to said outlet orifice for receiving on their elongated surfaces fuel droplets from the mixture, said elements being in closely associated arrangement and having interspersed therebetween and extending generally lengthwise thereof a plurality of generally elongated passages whereby the fuel-air mixture moves generally lengthwise of said elongated surfaces and fuel droplets thereon are filmed out lengthwise therealong and the films attenuated in the direction of flow, thereby accelerating their vaporization.

9. A fuel vaporizer as in claim 8 in which said casing and its intake orifice are coaxial and said pervious means extends generally transversely of the casing, and including a baffle interposed between the casing intake orifice and the transversely extending pervious means, said baffle being formed with stepped terraces concentric with the axis of the casing intake orifice and the casing, each of said terraces being provided with a plurality of apertures dividing the mixture into a plurality of streams before entrance into the said pervious means.

10. Means for evaporating the liquid component in a stream of gas containing a liquid in atomized form comprising means for subdividing the stream into a plurality of streams, a vaporizing packet interposed wholly in the path of the streams and constituted of a plurality of smooth undulating ribbon filaments intermingled with air passages, the filaments being impervious to but wettable by the liquid and extending lengthwise generally in the direction of flow of the streams, means for directing the streams to flow through the packet, and means for recombining the streams after passage through the packet.

11. In a carburetion system supplying a fuel-air mixture, means for vaporizing the fuel in the mixture comprising means for dividing the mixture into a plurality of streams, a vaporizing packet interposed in the paths of all the streams including a plurality of smooth ribbon filaments intermingled with air passages, the filaments being impervious to but wettable by the fuel and extending lengthwise generally in the direction of flow of the streams, and means for recombining the streams after passage through the packet.

12. In a system supplying a fuel-air mixture from a carbureter to an internal combustion engine, means therebetween for vaporizing the fuel in the mixture comprising a casing having vertically aligned first and second orifices communicating respectively with the carbureter and the engine, means supported in the casing intermediate the orifices for dividing the mixture into a plurality of streams, a first vaporizing packet interposed in the path of the mixture between the first orifice and the dividing means, and a second vaporizing packet interposed in the paths of all the streams between the dividing means and the second orifice, each of said packets including a plurality of smooth ribbon filaments intermingled with air passages, the filaments being impervious to but wettable by the fuel and extending lengthwise generally in the directions of flow of the mixture and of the streams, respectively.

13. In a system supplying a fuel-air mixture from a carbureter to an internal combustion engine, means therebetween for vaporizing the fuel in the mixture comprising a casing having vertically aligned orifices communicating respectively with the carbureter and the engine, means supported in the casing in a zone thereof intermediate and parallel to the orifices for dividing the mixture into a plurality of streams and a vaporizing packet interposed in the paths of all the streams between the dividing means and the engine including a plurality of smooth ribbon filaments intermingled with air passages, the ribbon filaments being impervious to but wettable by the fuel and extending lengthwise generally in the direction of flow of the streams between the dividing means and the engine.

14. In a system supplying a fuel-air mixture from a downdraft carbureter to an internal combustion engine, means therebetween for vaporizing the fuel in the mixture comprising a casing having vertically aligned intake and outlet orifices communicating respectively with the carbureter and the engine, a baffle intermediate the orifices supported in the casing and dividing the same into an upper and a lower chamber and provided with a plurality of perforations adjacent its perimeter, a vaporizing packet in the upper chamber interposed between the intake orifice and the perforations and a like packet in the lower chamber interposed between the perforations and the outlet orifice, each packet including a plurality of smooth ribbon filaments intermingled with air passages, the filaments being impervious to but wettable by the fuel and extending lengthwise generally in the direction of flow of the mixture above and below, respectively, the baffle.

15. In a downdraft carburetion system supplying a fuel-air mixture, a vaporizing unit comprising a casing having vertically aligned inlet and outlet orifices for inlet and egress, respectively, of the mixture, a baffle within the casing arranged normal to the initial downdraft and causing the mixture to spread radially, a plurality of ports in the baffle provided for passage of the mixture and a filamentous vaporizing packet within the casing and arranged below said baffle so that the length of the filaments thereof is substantially parallel to the downward flow of the mixture from said plurality of ports in the baffle to the outlet orifice of the casing, said packet having a cross-section transversely of said filaments that is substantially the same as the cross-section of the casing below said baffle, and said packet having upper and lower ends arranged with respect to said baffle ports and said outlet orifice respectively, said filaments being in closely associated arrangement and having flow passages therebetween for movement of fuel-air mixture from the ports in the baffle to said outlet orifice.

16. For use in a carbureting system supplying a fuel-air mixture, a vaporizer comprising a casing having inlet and outlet orifices for in and out passage of the mixture, respectively, and an enlarged body portion intermediate the orifices, a baffle dividing said portion into separate chambers and provided with a plurality of ports interconnecting the chambers, and a plurality of filamentous packets arranged in said chambers through which all the mixture is constrained to flow, said packets being composed of long ribbon-like filaments impervious to but wettable by the fuel and generally oriented in the direction of flow of the mixture for filming out on their surfaces liquid fuel components which wet them, said ribbon-like filaments being relatively loosely arranged in the packets to provide substantial flow spaces therebetween, the filaments per se occupying in their aggregate approximately five per cent of the total volume of the packets, thereby providing in each packet a plurality of passages for the fuel-air mixture, said generally oriented filaments having undulations that co-act in loosely spacing them one from another.

17. A vaporizer adapted for use in a carbureting system supplying a fuel-air mixture to an internal combustion engine having a plurality of cylinders in each of which a piston sweeps out in each intake stroke a fixed volume, comprising a casing having inlet and outlet orifices for the passage of the mixture and an enlarged body portion between the orifices, a baffle dividing the body portion into a pair of chambers and provided with a plurality of ports interconnecting the chambers whereby one of said chambers provides a path and direction of flow for fuel-air mixture from the inlet orifice to said baffle ports and the other of said chambers provides a path and direction of flow from said baffle ports to the outlet orifice, a filamentous vaporizing packet arranged in each of said chambers so that the length of the filaments thereof is substantially parallel to the direction of flow of fuel-air mixture in the chamber, the packet in each chamber having a substantially oblong cross-section generally parallel to its filaments and having opposite ends arranged substantially transversely of the direction of fuel-air mixture flow through the chamber whereby passage to the mixture flowing in said chambers is afforded only through the respective packets therein, the filaments in each packet being in closely associated arrangement and having flow passages therebetween for movement of fuel-air mixture from one of said opposite ends to the other.

18. A device for enhancing the vaporization of the fuel component of a flowing fuel-air mixture, comprising means forming a flow chamber having an entry and an exit for the passage of fluid therethrough in direction from the entry to said exit and having substantially impervious walls extending from the former to the latter for guiding flow in said direction and a vaporizing packet for flow of mixture from an entry end portion thereof, to an exit end portion thereof, said packet being positioned in said flow chamber with its entry end portion exposed at said flow chamber entry and its exit end portion exposed at said flow chamber exit and having a plurality of closely associated smooth ribbon filaments that extend individually from said entry end portion to said exit end portion with intervening lengthwise extending spaces so that said ribbon filaments are interspersed with air passages extending lengthwise generally in the direction of flow of the fuel-air mixture from said entry end portion toward said exit end portion thereof, said packet having a cross-section, transversely of said lengthwise extending filaments and of the said lengthwise extending intermingled air passages, that is substantially the same as the cross section of said flow chamber means between said impervious walls thereof, said ribbon filaments having portions thereof distorted out of their longitudinal axes to coact in laterally spacing adjacent ribbon filaments from one another and thereby coact in providing said air passages and in maintaining said cross-section of said packet so that it conforms susbtantially to the said cross-section of said flow chamber means whereby fuel-air mixture entering the entry of the latter is constrained to flow along said air passages and fuel droplets deposited on said ribbon filaments are by the mixture flowing along said air passages filmed out upon and attenuated lengthwise of said ribbon filaments in the direction toward said exit, thereby to enhance vaporization thereof.

GEORGE L. BRIGGS.

References Cited in the file of this patent

UNITED STATES PATENTS

| Number | Name | Date |
|---|---|---|
| 1,496,224 | Hofmann | June 3, 1924 |
| 1,510,221 | Herman | Sept. 30, 1924 |
| 1,533,364 | Barrott | Apr. 14, 1925 |
| 1,540,987 | Heintz | June 9, 1925 |
| 1,577,704 | Fleming | Mar. 23, 1926 |
| 1,663,931 | Woodsome | Mar. 27, 1928 |
| 1,949,803 | Loebs | Mar. 6, 1934 |
| 1,967,133 | Schreurs | July 17, 1934 |
| 1,967,330 | Sevison | July 24, 1934 |
| 1,973,745 | Bucklen | Sept. 18, 1934 |
| 2,097,216 | Schreurs | Oct. 26, 1937 |

FOREIGN PATENTS

| Number | Country | Date |
|---|---|---|
| 559,185 | Great Britain | Feb. 8, 1944 |